Feb. 23, 1943.　　　　　U. LAMM　　　　　2,311,839
STATIC CURRENT CONVERTER WITH VOLTAGE REGULATION
Filed Nov. 5, 1940　　　　3 Sheets-Sheet 1
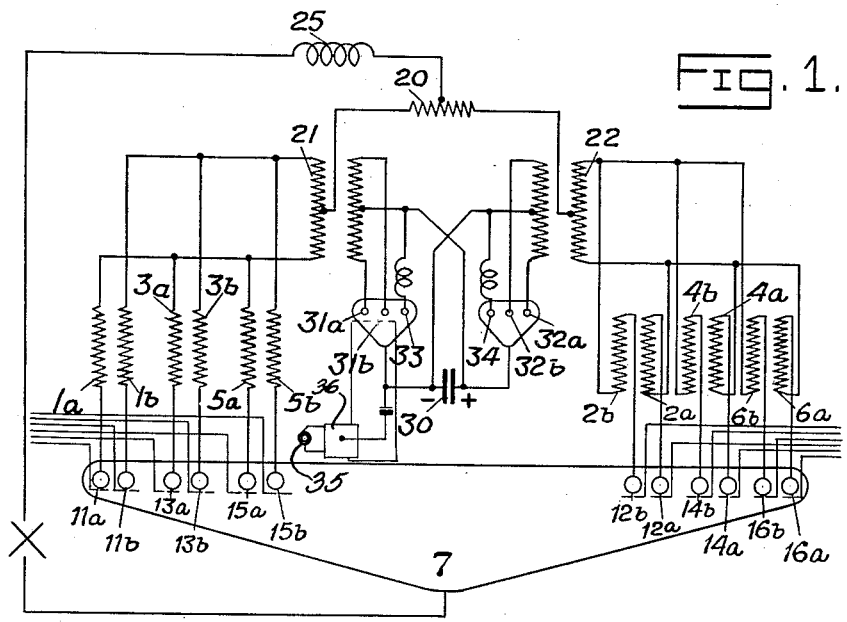
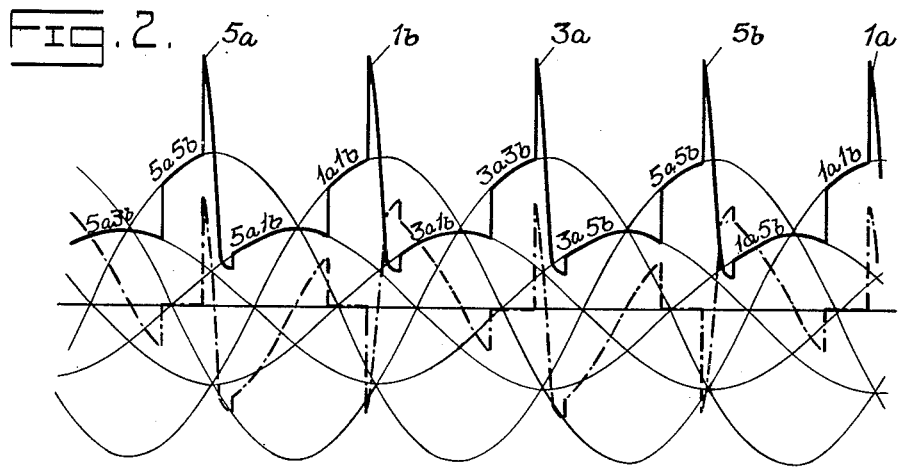
INVENTOR
Uno Lamm
BY
W. Wallace White
ATTORNEY Feb. 23, 1943.  U. LAMM  2,311,839
STATIC CURRENT CONVERTER WITH VOLTAGE REGULATION
Filed Nov. 5, 1940  3 Sheets-Sheet 2
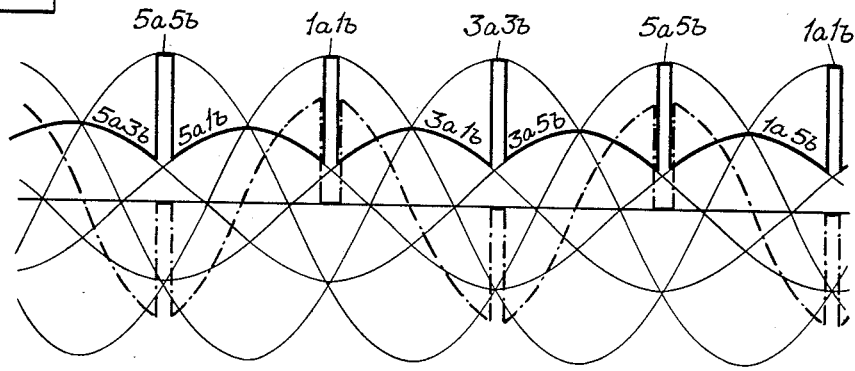
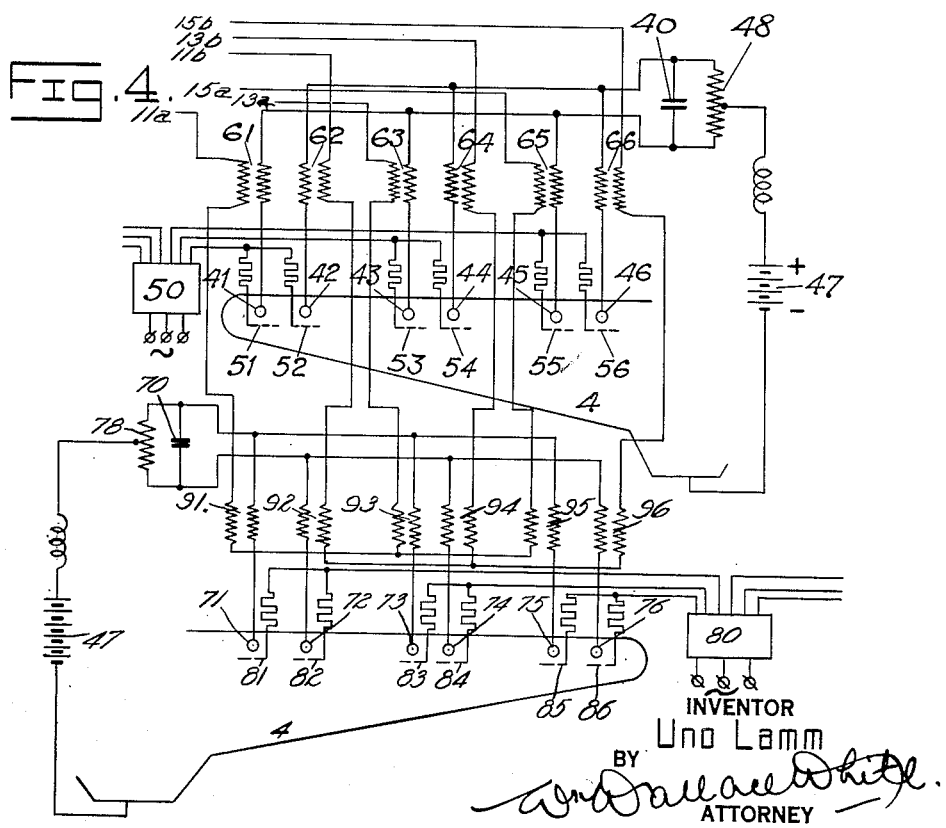
INVENTOR
Uno Lamm Feb. 23, 1943.　　　U. LAMM　　　2,311,839
STATIC CURRENT CONVERTER WITH VOLTAGE REGULATION
Filed Nov. 5, 1940　　　3 Sheets-Sheet 3
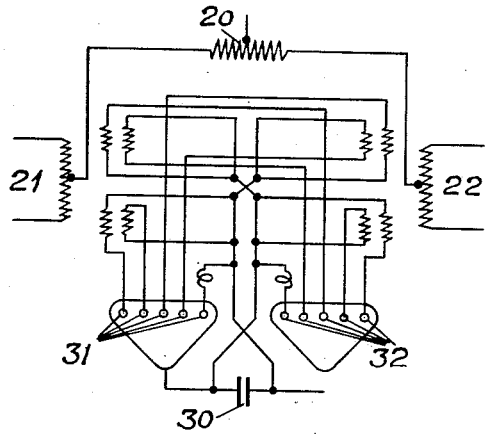
Fig. 5.
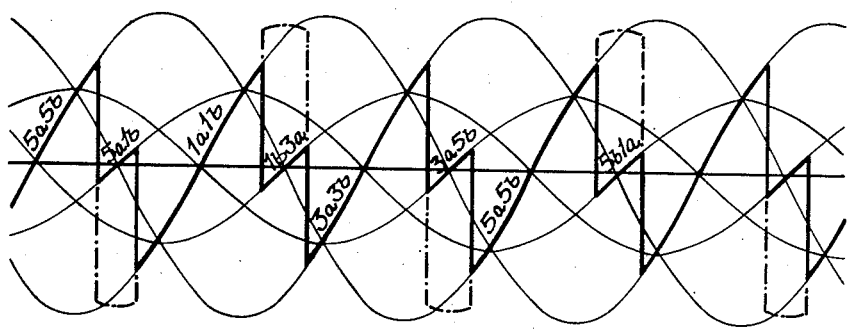
Fig. 6.
Fig. 7.
INVENTOR
Uno Lamm
BY
ATTORNEY Patented Feb. 23, 1943

2,311,839

UNITED STATES PATENT OFFICE 2,311,839

STATIC CURRENT CONVERTER WITH VOLTAGE REGULATION

Uno Lamm, Ludvika, Sweden, assignor to Allmänna Svenska Elektriska Aktiebolaget, Vasteras, Sweden, a corporation of Sweden Application November 5, 1940, Serial No. 364,340
In Sweden November 8, 1939

5 Claims. (Cl. 175—363)

Different methods have been proposed for obtaining, in voltage regulation of static current converters by grid control, better phase conditions in the alternating current network or networks than those which are possible to obtain by the simple regular retardation of the commutation of each anode. The problem is comparatively simple as long as it is simply desired to obtain the smallest possible phase angle within the the whole voltage range or, in other words, the smallest possible consumption of reactive power by the converter. In such a case, it is for instance possible to connect two converters in parallel, one of these having the commutating instants displaced as much forwards in time as the other one rearwards. It is also possible to block certain anodes which are thus passed by in the commutation. In the last-mentioned manner, certain voltage steps are obtained at which the power factor on the alternating current side is equal to unity, and in the intermediary voltage range a simple retardation of the commutation may be resorted to without causing the power factor to differ very much from unity.

A considerably more difficult problem which it is desirable to solve in many cases is to control the voltage and the phase displacement on the alternating current side substantially independently of one another, so as to make it possible to cause the current converter, for each value of the voltage ratio, to deliver or absorb a quantity of reactive power, which is controllable at will within reasonable limits. This problem cannot be solved by any of the aforesaid methods. When leaving out certain anodes in the commutating sequence, the power factor is fixed to unity at certain values of the voltage ratio, and when using parallel-connected converters, one of which is commutated in advance and the other in retard, the power factor is always fixed to unity, if the converters are not differently loaded, which necessitates their over-dimensioning in proportion to normal load. It is true that the converters may operate at different voltages if they are connected in series instead of in parallel, but such a connection causes other inconveniences, for instance that the voltage drop is doubled and thereby also the losses.

The present invention relates to a static current converter connection which makes it possible to control the voltage and the phase displacement independently of one another within wide limits without being subject to any of the aforesaid inconveniences or limitations. The characteristic feature of the connection is that it operates with two anode sequences connected in parallel through an interphase transformer, the commutation phases of which are controllable independently of one another but which represent no permanent subdivision but a division alternating with the commutation, so that each anode alternatively serves in one sequence and in the other. Such an alternative service of the anodes in different sequences connected through an interphase transformer is known per se, but its property to facilitate an independent control of the voltage and the phase displacement has not been realized or utilized before, and the arrangement has therefore not been employed in the combination herein proposed. It makes such an independent control possible for the reason, that by the alternative transfer of the anodes from one sequence to the other, voltage is applied to the interphase transformer alternatively in both directions, and it is therefore possible to obtain the voltage equalization which is not possible between parallel-connected anode groups in a permanent order of division.

Various forms of the invention, applied to a converter operating in six-phase, are diagrammatically illustrated in the accompanying drawings. Fig. 1 shows such a form, while Figs. 2 and 3 show diagrams of its manner of operation for different cases of regulation, rectifying being chosen as an example. Fig. 4 shows an example of an auxiliary circuit for grid control of a converter according to the previous figures. Fig. 5 shows a diagram, corresponding to the central portion of Fig. 1, of another form, and Figs. 6 and 7 two diagrams of different manners of operation which are made possible by this form.

Fig. 1 shows a valve vessel 7, containing two groups of anodes, each of which is connected to a three-phase winding group on a transformer, the primary winding of which is not shown. Each phase has two windings connected to one anode each. The phase windings of one three-phase group is designated by 1, 3, 5 and of the other three-phase group, which is displaced 60° with respect to the former, by 2, 4, 6. The two windings belonging to the same phase are distinguished from each other by the additional symbols $a$, $b$. The anode connected to each winding has the number of the winding increased by 10, so that for instance the anode 11a belongs to the winding 1a.

The two three-phase groups denoted by the symbols $a$, $b$ have neutral points which are connected together through interphase transformers, denoted by 21 for the odd three-phase star and by 22 for the even one. These interphase transformers serve during the commutation periods as secondary windings of commutating transformers. The primary windings of these commutating transformers are connected through blocking valves ("correspondent transition anodes") 31a, 31b, 32a, 32b to a common commutating condenser. By the six-phase arrangement, the connection of this condenser to the commutating transformer is simplified while utilizing both discharging directions for the commutation. Otherwise the manner of operation of the even three-phase star is, from the view-point of the present invention, quite analogous to that of the odd one, whence only the latter is described in the following lines. The neutral points of the two interphase transformers 21 and 22 are connected to the terminals of a central interphase transformer 20, the midpoint of which forms the one direct current terminal (negative in rectifying), while the cathode of the vessel 7 forms the other terminal. The grid control of the auxiliary anodes 31a and 31b may be effected by simple means consisting of a small single-phase generator 35 running at a speed giving a peaked voltage curve of one and a half the normal frequency. This generator 35 is connected to the grids of the anodes 31a and 31b through a phase rotating device 36, a direct current source giving a negative base voltage being connected between the neutral of said device 36 and the cathode of the auxiliary anode vessel.

Fig. 2 shows one example of the mode of operation of a connection according to Fig. 1, the control of the commutation being such as to give about 70% of maximum voltage, while the converter furnishes a capacitative current (a certain reactive power) to the alternating current network. In the diagram, the voltages of the different phase windings are represented by thin lines and the resultant direct current voltages between the cathode and the interphase transformer neutral by full heavy lines, the mean value of said latter voltages, equalized by the central interphase transformer 20 and the smoothening reactor 25, determining the voltage of the direct current network. For each partial cycle, the numbers of the windings are given which carry current, as their anodes are burning. At the beginning of the diagram, the anodes 15a and 13b are burning, corresponding to the windings 5a and 3b. The difference between the voltages of these two windings are initially rather large, corresponding to a high voltage on the interphase transformer 21, said voltage being represented by the dash and dotted curve. When the voltage curves intersect, the means voltage will be a maximum and the voltage on the interphase transformer 0.

About 20° after the aforesaid point of intersection, the anode 15b is liberated and is then ignited as it has a higher potential than the anode 13b. The two anodes 15a and 15b belonging to the same phase will thus burn simultaneously, whence the external voltage will be equal to the voltage of both and the voltage on the interphase transformer will be 0. About 10° after the anode voltages have passed their maximum, that is, 50° before the next point of natural commutation, a commutation is forced from the anode 15b to the anode 11b. This may be made in any possible manner, for instance by extinguishing grids, by a superposed voltage wave or by a transition anode. In the form shown, the commutation is forced in such manner that the anode 15a is first caused to absorb the current of the anode 15b together with its own, and then it leaves half of its current to the anode 11b. For this purpose, the valve path through the correspondent transition anode 31 is liberated, so that the condenser 30, which has been previously loaded with the right plate positive, is unloaded over the said anode. The interphase transformer 21 will then be positive at its lower and negative at its upper end, and the anode 15a will be more positive than the anode 15b. The former then absorbs the whole current, but as the condenser is unloaded, the potential of the anode 15a sinks and that of the b system rises, so that the anode 11b, liberated in the meantime, begins to absorb part of the current. The unloading continues until the anodes 15a and 11b divide the current at equal parts, the interphase transformer being then at equilibrium without a primary current. The potential of the midpoint of the interphase transformer has then risen to the value represented by the beginning of the curve portion 5a 1b, and then it follows this curve portion during 70°, whereupon the anode 11a is liberated and a spontaneous commutation takes place to this anode from the anode 15a.

The next step will be a forced commutation from the anode 11a to 13a, taking place 120° after the just-described forced commutation from 15b to 11b. Then comes a spontaneous commutation from 11b to 13b 120° after the spontaneous commutation from 15a to 11a. It is thus found that the premature commutations, occurring at intervals of 120°, alternatively take place in the b group and in the a group, and that this is also the case with the spontaneous retarded commutations, also occurring at 120° intervals. Each individual anode alternatively forms part of the sequence, from which or to which a forced commutation takes place, and also of the sequence commutating spontaneously. Thus, for instance, the anodes form part of the sequence, relieved by forced commutation, in the order 15b, 11a, 13b, 15a, 11b, 13a, and simultaneously in the sequence, relieving by forced commutation, in the order 11b, 13a, 15b, 11a, 13b, 15a. During the same period of time, the current from the anodes 15a, 11b, 13a, 15b, 11a, 13b is spontaneously commutated in the named order to the anodes 11a, 13b, 15a, 11b, 13a, 15b. Each complete commutation thus takes place alternatively within the a group and within the b group, but at a forced commutation in one group, an anode of the other group serves as a transition anode. A premature commutation in one group is always accompanied by a retarded commutation in the other, whence the anode sequences, the commutating instants of which lie on opposite sides of the instant of natural commutation, and which thus represent opposite types of inductive load on the alternating current network, are always separated by the interphase transformer, which thus effects an equalization of voltage if the voltage regulation of the two sequences is different. At the same time, these anode sequences comprise alternatively anodes from both groups, connected to different terminals of the interphase transformer, whence the latter is subjected to an alternating voltage and thus is capable of effecting a voltage equalization which it is not if a permanent anode group on one side thereof gives another direct current voltage than a permanent anode group on its other side.

In the form shown, a forced commutation takes place when the result of the commutation will be a simultaneous burning of two anodes of different phase, while the commutations leading to anodes of the same phase go spontaneously. This arrangement is the normal one in rectifiers, when one of the sequences is commutated in advance and the other is retarded. It facilitates in the most simple manner a rational utilisation of the commutating condenser which, after the termination of one forced commutation, will have the load required for the next one. As is evident from Figs. 5–7 and the corresponding part of the specification, a more complicated connection of the commutating condenser is necessary if both sequences are commutated in advance.

Fig. 3 shows an example of a more advanced reduction of the voltage ratio in the connection according to Fig. 1, giving a direct current voltage of only about half of the maximum one, while the phase angle on the alternating current side is 0, giving a power factor=1. The superimposed voltage waves for forced commutation are not marked. The reference characters are identical to those of Fig. 2, and the manner of operation is believed to be understood without a detailed description. Anodes of the same phase are simultaneously active only during short periods near the voltage crest value of each phase, and in the intermediary periods, anodes of 120° mutual phase displacement are simultaneously burning.

What is especially characteristic to each anode sequence and differentiates it from the other one is the grid control. In the described form of forced commutation, the grid control is most simply arranged in such way that each anode has a grid which is kept at a negative potential during the major portion of the cycle and obtains a short positive impulse only when the corresponding anode shall be ignited. Each individual anode, as aforesaid, alternatively belongs to the sequence commutated in advance and to that commutated in retard, and more precisely, to the former one during every second full cycle and to the latter during the rest. Since the phase of the grid impulses belonging to the former sequence shall be controllable independently of the phase of those belonging to the latter, these impulses should be derived from entirely independent apparatus. Each one of these apparatus has a circuit for each individual grid, and this circuit should furnish an impulse only during every second full cycle. This problem can be solved by a rotating frequency converter giving grid impulses of only half of the alternating current frequency, but it can also be solved by means of an apparatus of static character, as for instance that diagrammatically shown in Fig. 4. An auxiliary discharge vessel for the grid control is in this figure shown in two parts and designated by 4, anodes therein by 41—46, and their control grids by 51—56. On the latter, there are impressed in pairs positive impulses through a phase rotating and peak generating apparatus 50 at a phase angle corresponding to one of the anode sequences. The grids 51 and 52 thus obtain such an impulse at the same time, the grids 53 and 54 another impulse, etc., each pair with a mutual phase difference of 120° at the normal frequency of the alternating current. The corresponding anodes are, however, connected to a direct current source 47 through an inductance 48 in parallel with a condenser 40 in such a manner that these members lie between the two anodes of each pair. If, for instance, the anode 41 is supposed to be active when a grid impulse arrives, the said anode reverses at the same time the load of the condenser 40 so far as to make the anodes having an even number essentially more positive than the odd ones at the next grid impulse, and therefore one of the former, and more precisely the anode 44, is ignited. In this manner the anode 41 will for instance transmit a current impulse only during every second full cycle and the anode 42 during the intermediary ones. By transformers 61—66 these current impulses are transmitted to the grids of the main current converter. A similar grid feeding apparatus may have its valve vessel common with that illustrated and is supposed to belong to the other sequence, and for each individual grid in the main current converter a secondary winding of one of the transformers 61—66 and a similar secondary winding of the aforesaid apparatus are connected in series. The right hand part of the vessel 4 is, for convenience of illustration, shown below the left-hand part in Fig. 4, and in this lower part the different elements belonging to the second grid control have reference numerals obtained by adding 30 to those of the first one, thus 70 corresponds to 40, etc. The direct current source 47 may, however, be common to both systems. It is important to note that the phase rotating apparatus 80 is controllable independent of the corresponding apparatus 50, whereby the instants of commutation of the second sequence can be controlled independently of those of the first one. This figure also shows how the secondary windings of the transformers 91—96 are connected in series with 61—66, and finally the outgoing conductors at the left of this figure are designated by the reference numerals of the corresponding anodes of Fig. 1 so that these conductors have only to be identified with the corresponding ones of Fig. 4 to give a complete grid control system. In this manner, each individual grid in the main current converter will obtain during every second cycle a positive impulse in a phase angle determined by one of the phase rotating apparatus and during every second cycle a positive impulse in a phase angle determined by the other phase rotating apparatus. This is, generally speaking, the presumption for the manner of operation described in connection with Figs. 2 and 3. For the forced commutation, certain additional impulses are of course necessary for the auxiliary anodes 31a, 31b, etc., but these additional impulses are generated in substantially the same way as those now described. As each such auxiliary anode serves three well-defined main anodes, its grid impulses may be obtained by a series connection of members representing the impulses to the grids of said anodes corresponding to the forced commutation, while an intermediary device for adjusting the phase may be interposed. The auxiliary anodes 31a, 31b, etc., may also be supplemented in a manner known per se by special load equalizing anodes 33, 34, which enter into function at a low load of the current converter for controlling the load reversal of the condenser.

The primary members for adjusting the phase angles of the grid impulses of the two different sequences may preferably be controlled according to some certain program. Such a program may for instance be the keeping constant of the direct current voltage as well as of the alternating current voltage at variable load. If for instance at an increase of the load only the voltage ratio is increased by reducing the retard of the commutation, the direct current voltage may certainly be kept constant, but at the same time the alternating current voltage generally varies in one direction or the other, depending on whether the increased load or the reduced phase displacement predominates. According to the present invention, the commutating phase of the sequence having a retarded commutation may for instance be regulated to constant direct current voltage by making its phase rotating device directly dependent on the difference between a constant standard voltage and the real direct current voltage, and at the same time the commutating phase of the sequence commutated in advance may be regulated to constant alternating voltage according to the same principle.

While in Figs. 2 and 3 one of the anode sequences is commutated in advance and the other in retard, Figs. 6 and 7 show two examples of a commutation in advance of both sequences. In these diagrams each commutation is thus forced, but the superimposed voltage waves, which may be necessary herefor, are not shown, as in Fig. 3. Both Figs. 6 and 7 refer to the extreme case, in which the direct current voltage is reduced to zero, i. e., the current converter operates as a pure phase compensator. The difference between the two figures is that while in Fig. 6 the anodes connected to windings of the same phase (for instance *1a*, *1b*) operate during 90° in each third part of a cycle and anodes connected to different phases during 30°, the conditions in Fig. 7 are opposite. The former arrangement gives a smaller load on the interphase transformer than the latter one, as is evident from the dash and dotted curve, which represents the voltage on the interphase transformer. Fig. 7, on the other hand, gives a smaller load on the smoothening reactor in the direct current circuit than Fig. 6.

As already mentioned, each commutation is forced in the operation of Fig. 6 as well as in that of Fig. 7. The voltage variation on the commutating condenser is, however, of essentially other character at a commutation to anodes of the same phase than at the commutation to anodes of different phase. In the latter case, the voltage on the condenser varies substantially as in Fig. 2, i. e., no superimposed voltage wave on the transition anode is necessary for initiating the commutation proper as the transition anode has already the potential necessary for absorbing the whole current. A superimposed voltage wave is, however, necessary first with respect to the commutation energy, i. e., to the surmounting of the reactance between the relieved anode and the transition anode, which, however, in this case when these two anodes belong to the same phase is rather small, and secondly with respect to the deionizing time, i. e., to assure that a sufficient time for the deionisation of the just active valve path shall elapse after the end of the commutation before the voltage curve of the transition anode, in sinking by the unloading of the condenser, again intersects the voltage curve of the relieved anode. For carrying out the second stage of the commutation, on the other hand, the potential of the transition anode must be lowered essentially below the previous value. This corresponds to a loading of the commutation condenser to a voltage of essentially the same numerical value, but opposite polarity, without any extraordinary measures, i. e., the relieving anode may be liberated beforehand so as to ignite as soon as the voltage conditions permit this.

When, on the other hand, a commutation shall take place from anodes of different phase to anodes of the same phase, for instance at the commutation from *5a 1b* to *1a 1b* in Figs. 6 or 7, when the anode *11b* serves as a transition anode, this latter anode needs, even apart from the time of deionisation, a superimposed voltage wave, which corresponds to the voltage difference between the curve *5a 1b* and the curve *1a 1b*. On the other hand, the said anode can later on deliver half of its current to the anode *11a* without a greater lowering of the voltage than that corresponding to the commutation work caused by the reactance. This means no essential reversal of the load of the condenser, whence the said load may be insufficient for the next commutation. It is true that this commutation goes from anodes of the same phase to anodes of different phases, and therefore does not require any additional superimposed voltage, but at any rate it requires a sufficient voltage to make the time of deionisation sufficiently long. For effecting the reversed load of the condenser, it may therefore be necessary to carry the first commutating process to an over-commutation, i. e., not to liberate the relieving anode until the condenser has been loaded further in the opposite direction than is necessary for the actual commutation.

On the other hand, it is comparatively favorable that every second commutation goes from anodes of different phase to anodes of the same phase and every second from anodes of the same phase to anodes of different phase, because for two subsequent forced commutations of the same type it would be still more difficult to deliver the condenser at the proper voltage.

If the diagram in Figs. 6 or 7 is supposed to represent the voltages of one three-phase group, for instance the left one at a connection of anodes and interphase transformer according to Fig. 1, the commutations in the right group will at a symmetrical connection take place during the long interval of 90° between two subsequent commutations in the left group. As each three-phase group will therefore commutate twice at a time, as distinguished from an operation according to Fig. 2 or 3, where the left and the right group alternate in their commutation, the connections between the condenser 30 and the interphase transformers 21, 22 must be made according to Fig. 5 to obtain a manner of operation according to Fig. 6 or 7. Each interphase transformer in Fig. 5 has four primary windings connected at one end to a correspondent transition anode and at the other to either side of the condenser 30. These windings are so directed that for each polarity of the condenser any desired polarity of the interphase transformer can be obtained. By the connection according to Fig. 1, on the contrary, it is only possible to utilize the left interphase transformer at the polarity of the condenser illustrated and the right transformer at the opposite polarity. Those correspondent transition anodes 31, 32, respectively, which in Fig.

5 are connected to the same side of the condenser 30, are situated in a common valve vessel.

A general advantage of the connection according to the present invention is that only half of the phase current is commutated at a time, whereby the commutation takes place with about half of the reactance energy against in a current converter of the normal type. Another advantage is that with a six-phase transformer substantially the same character of the direct current can be obtained as otherwise by a twelve-phase transformer ("twelve pulse character"). Another general advantage is that shortly mentioned above that the commutating energy will be particularly small when the transition anode absorbs the current from an anode of the same phase, as is for instance always the case in Fig. 2, or when it delivers during the second stage of the commutation half of the current to an anode of the same phase, as is the case with the second of the commutations illustrated in Figs. 6 and 7, as in both these cases the reactance is small between the anodes, between which the commutation takes place.

I claim as my invention:

1. A static current converter comprising a number of valve paths between which the current is commutated in two different sequences in both of which each individual valve path alternately forms a part, an interphase transformer connecting the valve paths belonging to the different sequences, and independently controlled means for grid control of the different sequences.

2. A static current converter comprising a number of valve paths between which the current is commutated in two different sequences in both of which each individual valve path alternately forms a part, an interphase transformer connecting the valve paths belonging to the different sequences, means for commutating the current in one of said sequences before the instant of natural commutation, and means for commutating the current in the other sequence independently of the first one.

3. A static current converter comprising a number of valve paths between which the current is commutated in two different sequences in both of which each individual valve path alternately forms a part, an interphase transformer connecting the valve paths belonging to the different sequences, means, including a series condenser, for commutating the current between such valve paths in one of said sequences before the instant of natural commutation that the valve paths connected by the interphase transformer after said commutation operate in the same phase, and means for commutating the current in the other sequence independently of the first one.

4. A static current converter comprising a number of valve paths between which the current is commutated in two different sequences in both of which each individual valve path alternately forms a part, an interphase transformer connecting the valve paths belonging to the different sequences, grid control means for one of said sequences arranged to regulate automatically to keep one electrical quantity controlled by the converter constant, and grid control means for the other of said sequences arranged to regulate automatically to keep another electrical quantity controlled by the converter constant.

5. A static current converter comprising a number of valve paths between which the current is commutated in two different sequences of which the individual valve paths alternatively form part, an interphase transformer connecting the valve paths belonging to the different sequences, and grid control means comprising auxiliary valve paths pairs of which have uniform grid control, and condensers separating the valve paths of said pairs.

UNO LAMM.